US012636667B2

(12) United States Patent
Egawa et al.

(10) Patent No.: US 12,636,667 B2
(45) Date of Patent: May 26, 2026

(54) COATING NOZZLE AND COATING APPARATUS

(71) Applicants: Kazuhiro Egawa, Shizuoka (JP); Susumu Muramatsu, Shizuoka (JP); Koji Sakurada, Shizuoka (JP)

(72) Inventors: Kazuhiro Egawa, Shizuoka (JP); Susumu Muramatsu, Shizuoka (JP); Koji Sakurada, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 465 days.

(21) Appl. No.: 18/135,755

(22) Filed: Apr. 18, 2023

(65) Prior Publication Data

US 2023/0338977 A1 Oct. 26, 2023

(30) Foreign Application Priority Data

Apr. 20, 2022 (JP) ................................ 2022-069307

(51) Int. Cl.
*B05B 12/14* (2006.01)
*B05B 7/12* (2006.01)

(52) U.S. Cl.
CPC ................ *B05B 12/14* (2013.01); *B05B 7/12* (2013.01)

(58) Field of Classification Search
None
See application file for complete search history.

(56) References Cited

U.S. PATENT DOCUMENTS 1,736,768 A * 11/1929 Boynton ............... B05B 7/1481 239/416.4
1,744,208 A * 1/1930 Buchanan ................. B05B 7/30 239/371
2,754,153 A * 7/1956 Barthod .................... B05B 7/12 239/526
2,959,358 A * 11/1960 Vork ......................... B05B 7/12 137/98
3,027,096 A * 3/1962 Giordano .............. B05B 7/2497 239/602

(Continued)

FOREIGN PATENT DOCUMENTS

JP 2002204992 A 7/2002
JP 2004-142382 5/2004

(Continued)

OTHER PUBLICATIONS

Japanese Office Action issued Dec. 5, 2025 in corresponding Japanese Patent Application No. 2022-069307 (9 pages; with English translation).

*Primary Examiner* — Jethro M. Pence
(74) *Attorney, Agent, or Firm* — XSENSUS LLP

(57) ABSTRACT

A coating nozzle includes: a nozzle hole from which a liquid paint is discharged in a liquid discharge direction; a liquid chamber communicating with the nozzle hole; a paint supply channel communicating with the liquid chamber, the paint supply channel configured to supply the liquid paint to the liquid chamber, a cleaning-liquid supply channel communicating with the liquid chamber, the cleaning-liquid supply channel configured to supply a cleaning liquid to the liquid chamber; and a switching section configured to selectively switch communication and non-communication between the paint supply channel and the liquid chamber.

13 Claims, 3 Drawing Sheets

(56) References Cited

U.S. PATENT DOCUMENTS

| | | | | |
|---|---|---|---|---|
| 3,059,858 | A * | 10/1962 | Linder | B05B 7/12 239/582.1 |
| 3,087,682 | A * | 4/1963 | Peeps | B05B 7/1209 239/414 |
| 3,558,051 | A * | 1/1971 | Strickler | B05B 12/14 222/145.2 |
| 3,567,129 | A * | 3/1971 | Martin | B05B 7/2424 137/892 |
| 3,650,479 | A * | 3/1972 | Liedberg | B05B 7/12 239/DIG. 14 |
| 3,791,580 | A * | 2/1974 | Taccon | B05B 7/12 239/434 |
| 4,106,699 | A * | 8/1978 | Holt | B05B 1/3013 239/127 |
| 4,309,456 | A * | 1/1982 | Lock | B05B 7/0012 118/316 |
| 4,838,311 | A * | 6/1989 | Vetter | B05B 12/14 239/69 |
| 4,881,563 | A * | 11/1989 | Christian | B05B 15/55 239/311 |
| 5,165,605 | A * | 11/1992 | Morita | B05B 7/0475 239/296 |
| 5,195,680 | A * | 3/1993 | Holt | B05B 15/58 285/132.1 |
| 5,236,128 | A * | 8/1993 | Morita | B05B 12/008 239/367 |
| 5,836,517 | A * | 11/1998 | Burns | B05B 7/2424 239/416 |
| 6,268,000 | B1 * | 7/2001 | Romer | A23G 3/28 222/326 |
| 7,591,899 | B2 * | 9/2009 | Uehara | B05C 11/10 239/568 |
| 7,861,666 | B2 * | 1/2011 | Luebbecke | B05C 5/0229 118/313 |
| 7,878,375 | B2 * | 2/2011 | Yajima | B05C 11/1039 251/65 |
| 8,881,757 | B2 * | 11/2014 | Melcher | F16K 31/12 251/63.4 |
| 8,899,171 | B2 * | 12/2014 | Mauck | B41J 29/393 118/50 |
| 9,254,501 | B2 * | 2/2016 | Nabeshima | B05B 12/1463 |
| 9,782,786 | B2 * | 10/2017 | Melcher | B05B 12/14 |
| 10,264,868 | B2 * | 4/2019 | Fedorov | B05B 7/02 |
| 10,384,219 | B2 * | 8/2019 | De Block | C09J 133/08 |
| 11,752,512 | B2 * | 9/2023 | Rueschhoff | B05B 11/0089 222/321.1 |
| 2004/0079284 | A1 * | 4/2004 | Dankert | F16K 37/0066 118/308 |
| 2004/0250759 | A1 * | 12/2004 | Ueno | B05B 1/3046 118/300 |
| 2007/0062642 | A1 * | 3/2007 | Reck | B05C 11/1013 427/256 |
| 2007/0204792 | A1 * | 9/2007 | Kang | C23C 16/4481 118/302 |
| 2009/0026290 | A1 * | 1/2009 | Fox | B05B 1/3046 239/345 |
| 2009/0120357 | A1 * | 5/2009 | Ikushima | H05K 13/0469 118/300 |
| 2010/0133353 | A1 * | 6/2010 | Herre | B05B 12/1409 239/444 |
| 2016/0082454 | A1 * | 3/2016 | Vogt | B65D 81/325 118/300 |
| 2017/0291182 | A1 * | 10/2017 | Yoon | B05B 15/25 |
| 2020/0171519 | A1 * | 6/2020 | Delsard | B05B 7/2429 |
| 2022/0379326 | A1 * | 12/2022 | Kimura | B05B 7/0483 |
| 2025/0010316 | A1 * | 1/2025 | Ritter | B05B 7/2416 |
| 2025/0288837 | A1 * | 9/2025 | Martens | B05B 7/2491 |

FOREIGN PATENT DOCUMENTS

| | | |
|---|---|---|
| JP | 2006-110822 | 4/2006 |
| JP | 2006-116437 | 5/2006 |
| JP | 2008-012404 | 1/2008 |
| JP | 2008093617 A | 4/2008 |
| JP | 2010-005518 | 1/2010 |
| JP | 2010-022889 | 2/2010 |
| JP | 2010-082592 | 4/2010 |
| JP | 2010-207806 | 9/2010 |
| JP | 2010-269606 | 12/2010 |
| JP | 2015089541 A | 5/2015 |

* cited by examiner

COATING NOZZLE AND COATING APPARATUS

CROSS-REFERENCE TO RELATED APPLICATIONS

This patent application is based on and claims priority pursuant to 35 U.S.C. § 119(a) to Japanese Patent Application No. 2022-069307, filed on Apr. 20, 2022, in the Japan Patent Office, the entire disclosure of which is hereby incorporated by reference herein.

BACKGROUND

Technical Field

Embodiments of the present disclosure relate to a coating nozzle and a coating apparatus.

Related Art

Coating nozzles provided with a nozzle hole, a liquid chamber, a paint supply unit, and a switching section have been developed. In such coating nozzles, the nozzle hole discharges liquid paint, and the liquid chamber communicates with the nozzle hole. Further, the paint supply unit supplies liquid paint to the liquid chamber, and the switching section enables or disables the nozzle hole to discharge the liquid paint.

An inkjet nozzle (or a coating nozzle) in the background art, for example, opens and closes the nozzle hole using a needle valve (i.e., the switcher) in the ink chamber (or the liquid chamber) communicating with the nozzle hole, so as to switch between enabling or disabling discharge of ink (i.e., liquid paint) from the nozzle hole.

SUMMARY

An embodiment of the present disclosure provides a coating nozzle includes: a nozzle hole from which a liquid paint is discharged in a liquid discharge direction; a liquid chamber communicating with the nozzle hole: a paint supply channel communicating with the liquid chamber, the paint supply channel configured to supply the liquid paint to the liquid chamber; a cleaning-liquid supply channel communicating with the liquid chamber, the cleaning-liquid supply channel configured to supply a cleaning liquid to the liquid chamber; and a switching section configured to selectively switch communication and non-communication between the paint supply channel and the liquid chamber.

Embodiments of the present disclosure enable a shorter cleaning time and reduce or prevent a decrease in coating productivity by injecting a cleaning liquid into the liquid chamber and the nozzle hole to clean the coating nozzle without the use of a cleaning tool.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
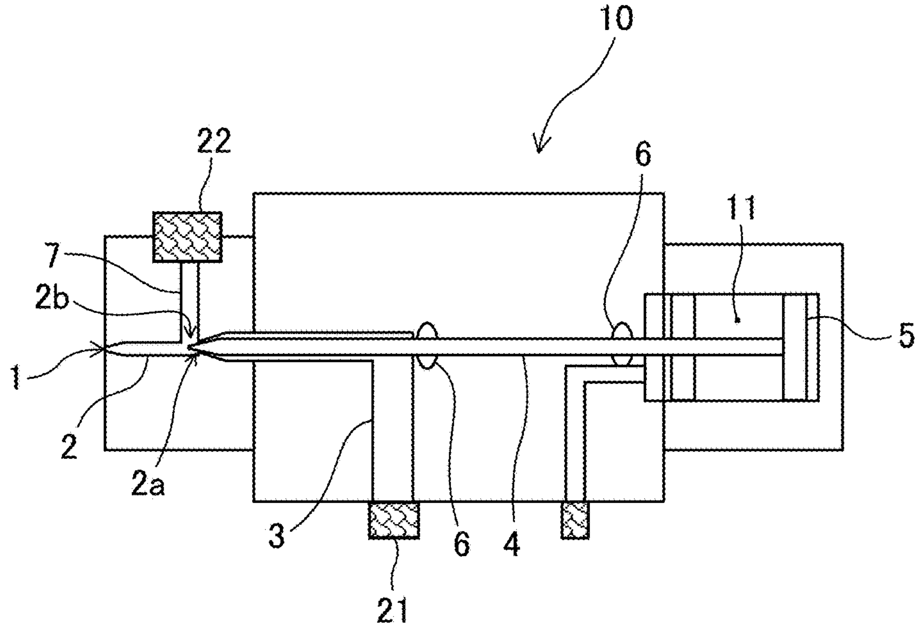
FIG. 1 is an illustration of a coating nozzle with a needle valve at a closed position, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A coating nozzle for use in a coating apparatus according to an embodiment of the present disclosure is described below.

Figure 2:
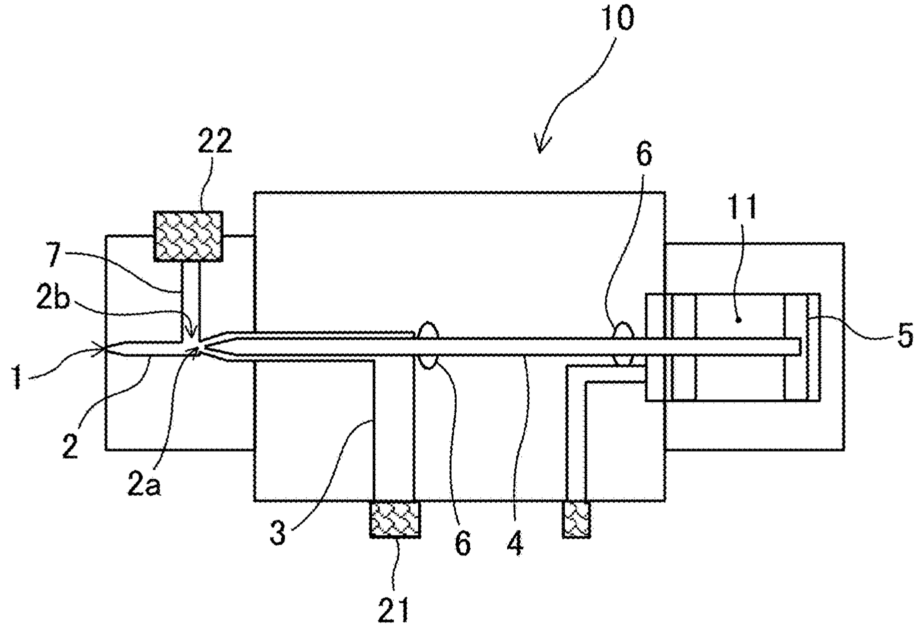
FIG. 2 is an illustration of the coating nozzle in FIG. 1 with the needle valve at an open position.

FIGS. 1 and 2 are illustrations of a coating nozzle 10 according to an embodiment of the present disclosure.

The coating nozzle 10 according to an embodiment includes a nozzle hole 1, from which a liquid paint (hereinafter simply referred to as paint or coating material) is discharged in a liquid discharge direction, a liquid chamber 2 communicating with the nozzle hole 1, and a paint supplier 3 as a paint supply channel that supplies paint to the liquid chamber 2. Further, the coating nozzle 10 further includes a needle valve 4 (or an opening and closing section) that opens and closes a paint inlet 2*a* of the liquid chamber 2. The needle valve 4 serves as a switching section that enables or disables the discharge of coating material from the nozzle hole 1 (i.e., the switching section selectively switches communication and non-communication between the paint supply channel and the liquid chamber). The coating nozzle 10 still further includes a driver 5 that drives the needle valve 4 and an elastic diaphragm 6 (or a blocker) that blocks the paint of the paint supplier 3 from entering an accommodating space 11 accommodating the driver 5. Furthermore, the coating nozzle 10 according to an embodiment includes a cleaning-liquid supplier 7 as a cleaning-liquid supply channel that supplies a cleaning liquid to the liquid chamber 2.

In the coating nozzle 10 according to an embodiment of the present disclosure, a paint feeding mechanism 21 is connected to the paint supplier 3, and a cleaning-liquid feeding mechanism 22 is connected to the cleaning-liquid supplier 7. The paint feeding mechanism 21 and the cleaning-liquid feeding mechanism 22 feed the respective liquids, independently of each other. In this configuration, the operation of feeding the paint from the paint feeding mechanism 21 to the paint supplier 3 is executed while the operation of feeding the cleaning liquid from the cleaning-liquid feeding mechanism 22 to the cleaning-liquid supplier 7 is stopped. Conversely, the operation of feeding the paint from the cleaning-liquid feeding mechanism 22 to the cleaning-liquid supplier 7 is executed while the operation of feeding the cleaning liquid from the paint feeding mechanism 21 to the paint supplier 3 is stopped.

The paint feeding mechanism 21 and the cleaning-liquid feeding mechanism 22 are not particularly limited, but a syringe pump, a pressurized tank, or the like can be suitably used. However, when the landing efficiency of the paint discharged from the nozzle hole 1 is extremely high, the paint feeding mechanism 21 is preferably controlled to supply a tiny amount of paint.

In the coating nozzle 10 of the present embodiment, when the paint is not discharged from the nozzle hole 1, as illustrated in FIG. 1, the needle valve 4 is moved to a closed position to close the paint inlet 2*a* of the liquid chamber 2 so as to disable the supply of the paint from the paint supplier 3 to the liquid chamber 2. When the paint is discharged from the nozzle hole 1, as illustrated in FIG. 2, the needle valve 4 is moved to an open position to open the paint inlet 2*a* of the liquid chamber 2 so as to enable the supply of the paint from the paint supplier 3 to the liquid chamber 2. This configuration controls the driver 5 to switch or move the position of the needle valve 4 between the open position and the closed position to enable or disable the paint fed from the paint feeding mechanism 21 to the paint supplier 3 to be discharged from the nozzle hole 1 through the liquid chamber 2.

The nozzle hole 1 according to an embodiment of the present disclosure discharges the paint within the liquid chamber 2 during the coating operation, and discharges the paint or the cleaning liquid within the liquid chamber 2 during the cleaning operation. The shape of the cross section of the nozzle hole 1, which is orthogonal to the discharge direction of the nozzle hole 1 is appropriately selected in consideration of the characteristics of the coating object and the paint. A typical shape of the cross-section of the nozzle hole 1 is preferably a circular shape or a quadrangular shape in consideration of the ease of processing of the nozzle hole 1.

The nozzle hole 1 preferably has a minimum opening dimension of 20 μm or more and a maximum opening dimension of 500 μm or less to reduce the non-uniformity in coating film and shorten a coating tact time. When the opening of the nozzle hole 1 has a circular shape, for example, its diameter is preferably 20 μm or more and 500 μm or less. When the opening of the nozzle hole 1 has a rectangular shape, for example, its short side is preferably 20 μm or more, and its diagonal line is 500 μm or less. A nozzle hole having a minimum opening dimension of less than 20 μm may become clogged with foreign matter, and a nozzle hole having a maximum opening dimension of more than 500 μm may more likely cause the non-uniformity in coating film to deteriorate.

Figure 3:
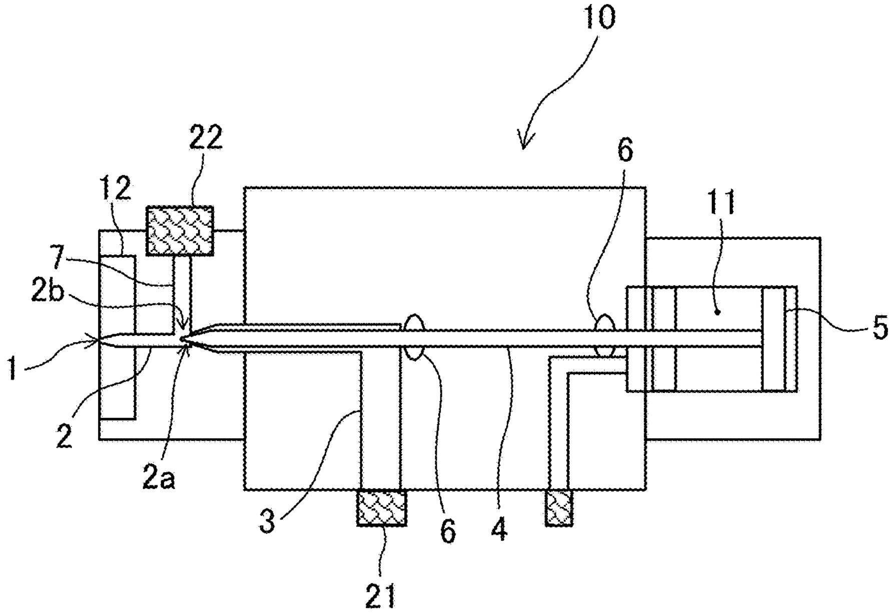
FIG. 3 is an illustration of a nozzle part attachable to or detachable from a body of the coating nozzle, according to the embodiments of the present disclosure.

The nozzle hole 1 may be directly formed in a body of the coating nozzle. Alternatively, a nozzle part including the outlet opening of the nozzle hole 1 may be fixed to the coating nozzle main body in an integral manner. However, as illustrated in FIG. 3, a nozzle part 12 including the opening (or an outlet opening) of the nozzle hole 1 may be attached to or detachable from the body of the body of the coating nozzle for ease of maintenance. The body includes the paint supplier 3 (the paint supply channel), the cleaning-liquid supplier 7 (the cleaning-liquid supply channel), and the needle valve 4 (the switching section). Such an attachable or detachable nozzle part 12 facilitates the maintenance of the nozzle hole 1 (e.g., cleaning) or a change in the shape or dimension of the nozzle hole 1 according to the coating application.

The material of an element forming the nozzle hole 1 is not limited, but is preferably a material having corrosion resistance to a paint or a cleaning liquid to be used.

The coating material for the coating nozzle 10 according to an embodiment of the present disclosure is not particularly limited. However, the characteristics such as the viscosity and the solid content concentration are appropriately selected according to the opening dimension of the nozzle hole 1 and the amount of paint discharged from the nozzle hole 1 during the coating operation. The nozzle hole 1 with a small opening dimension may fail to discharge paint having a high viscosity or have difficulty in stably discharging paint having a high viscosity. The solid content concentration and viscosity of the paint may be reduced to deal with such a situation. The reduction in the solid content concentration and viscosity of the paint (coating material) allows stable discharge from the nozzle hole 1, but causes disadvantages: more amount of paint to be discharged to obtain desired coating thickness; a deterioration in the non-uniformity in film thickness due to an increase in a wet film thickness of an object to be coated; and a longer dry-to-touch time.

Fine particles may be contained in the coating material, but if the fine particles are larger than the opening dimension of the nozzle hole 1, discharge failure is likely to occur, and discharge failure may not be recovered by washing. For this reason, sufficient consideration is to be given to the selection of the particle diameter of the fine particles.

To prevent or reduce clogging of the nozzle hole or the liquid chamber with liquid coating material, or paint in the coating nozzle 10, cleaning the nozzle hole and the liquid chamber with a cleaning liquid is effective. However, a typical cleaning method involves injecting a cleaning liquid into the outlet of the nozzle hole using a cleaning tool. The typical cleaning method causes complicated and time-consuming cleaning operation and lowers coating productivity.

By contrast, embodiments of the present disclosure include a cleaning-liquid supplier for supplying a cleaning liquid to the liquid chamber and involve injecting a cleaning liquid into the liquid chamber and the nozzle hole without using a cleaning tool.

There are no particular restrictions on the cleaning liquid that can be used in the coating nozzle 10 according to an embodiment of the present disclosure, but in general, a cleaning liquid using a solvent that is the same as or more soluble than the solvent contained in the coating material is desirable.

Specific examples thereof include, but are not limited to, water, methanol, ethanol, toluene, tetrahydrofuran, methyl ethyl ketone, cyclohexanone, cyclopentanone, acetone, N-methyl-2-pyrrolidone, and N, N-dimethylformamide.

The paint supplier 3 includes a channel for conveying paint fed from the paint feeding mechanism 21 to the liquid chamber 2. As illustrated in FIGS. 1 and 2, the downstream end of the paint supplier 3 connected to the paint inlet 2*a* of the liquid chamber 2 along a channel from the paint feeding mechanism 21 to the paint inlet 2*a* is tapered. The front-end portion of the needle valve 4 is arranged in the paint supplier 3. As illustrated in FIG. 1, the leading end of the needle valve 4 is moved to the closed position to close the downstream end of the paint supplier 3 (i.e., the paint inlet 2*a* of the liquid chamber 2) so as to block paint from being supplied from the paint supplier 3 to the liquid chamber 2. As illustrated in FIG. 2, the leading end of the needle valve 4 is moved to the open position to open the downstream end of the paint supplier 3 (i.e., the paint inlet 2*a* of the liquid chamber 2) so as to enable the paint to be supplied from the paint supplier 3 to the liquid chamber 2.

The driver 5 that drives the needle valve 4 presses the needle valve 4 toward the paint inlet 2*a* of the liquid chamber 2A using a biasing force of a biasing member such as a spring, to move the needle valve 4 to the closed position. To move the needle valve 4 to the open position, the driver 5 includes a driving mechanism that moves the needle valve 4 backward (i.e., in an upstream direction) to the open position using a force exceeding the biasing force of the biasing member.

The driving mechanism is not particularly limited, but is preferably electromagnetically driven or pneumatically driven in view of responsiveness, safety, and convenience.

The electromagnetic drive mechanism may be, for example, a solenoid. A fixed iron core of a solenoid is arranged facing a magnetic body at a rear end of a needle valve, and a current is applied to the solenoid to generate a magnetic field. This causes the rear end of the needle valve to be attracted to the fixed iron core to pull down the needle valve 4 backward and position it at the open position. Such a driving mechanism can precisely control the opening and closing operation of the paint inlet 2*a* using the needle valves 4 by controlling the electric current supplied to the solenoid. This enables control of the discharge pattern and the discharge amount of paint discharged from the nozzle holes 1 with high accuracy.

The pneumatically-driven mechanism is suitable for placing a high priority on safety and convenience. In such a drive mechanism, the pressure of the compressed air is used to drive the needle valve to move it rearward.

The driving mechanism of the driver 5 may be driven by a piezoelectric element. In the driving mechanism using the piezoelectric element, the needle valve 4 with its rear end fixed to the piezoelectric element is moved between the close position and the open position using the distortion or displacement of the piezoelectric element in response to applied voltage. This enables a high-speed control of the position of the needle valve 4 and thus allows control of the open-close operation of the paint inlet 2*a* with high response.

In the coating nozzle 10 according to an embodiment of the present disclosure, the elastic diaphragm 6 is disposed to divide the paint supplier 3 in which the front-end portion of the needle valve 4 and the paint are included, from the accommodating space 11 accommodating the driver 5 attached to the rear-end portion of the needle valve 4. The elastic diaphragm 6 is provided to close a gap between the paint supplier 3 and the accommodating space 11 while allowing the needle valve 4 to move between the closed position and the open position. A pressure produced by the paint feeding mechanism 21 supplying paint to the paint supplier 3 is applied to the paint in the paint supplier 3. Irrespective of the pressure being applied to the paint supplier 3, the elastic diaphragm 6 blocks the paint of the paint supplier 3 from entering the accommodating space 11.

The material of the elastic diaphragm 6 is preferably selected according to the solvent contained in the paint. Particularly when an organic solvent is used, the elastic diaphragm 6 made of a solvent-resistant material extends the life of the elastic diaphragm 6 and achieves a stable driving over a long period of time. Further, the material of the elastic diaphragm 6 is preferably resistant to a solvent contained in a cleaning liquid, in consideration of the possibility that the cleaning liquid might be mixed into the interior of the paint supplier 3.

In the coating process using the coating nozzle 10, the paint feeding mechanism 21 first feeds paint to the paint supplier 3 with the cleaning-liquid feeding mechanism 22 deactivated (i.e., the operation of feeding a cleaning liquid from the cleaning-liquid feeding mechanism 22 to the cleaning-liquid supplier 7 is stopped). In this state, when positioned at the closed position to close the paint inlet 2*a* of the liquid chamber 2 after being moved by the driver 5, the needle valve 4 blocks the paint fed from the paint supplier 3 from being supplied to the liquid chamber 2. Thus, the paint is not discharged from the nozzle hole 1.

When the needle valve 4 is positioned at the open position after being moved by the driver 5 with the paint supplier 3 filled with the paint, a gap is created between the leading end of the needle valve 4 and the downstream end of the paint supplier 3 along the channel from the paint feeding mechanism 21 to the paint inlet 2*a*. Thus, the paint inlet 2*a* of the liquid chamber 2 is opened, the paint inlet 2*a* being connected to the downstream end of the paint supplier 3. This allows the paint supplier 3 to supply its paint to the liquid chamber 2 through the paint inlet 2*a* and thus enables discharge of the paint from the nozzle hole 1 communicating with the liquid chamber 2.

At this time, since the operation of feeding the cleaning liquid from the cleaning-liquid feeding mechanism 22 to the cleaning-liquid supplier 7 is stopped, the cleaning liquid is not supplied from the cleaning-liquid supplier 7 to the liquid chamber 2, and only the paint (coating material) is discharged from the nozzle hole 1. In examples as illustrated in FIGS. 1 to 4, a cleaning-liquid inlet 2*b*, from which a cleaning liquid is supplied from the cleaning-liquid supplier 7 to the liquid chamber 2, is designed to be open. In some other examples, the cleaning-liquid inlet 2*b* is provided with a opening and closing section for opening and closing the cleaning-liquid inlet 2*b*. In this case, the cleaning-liquid inlet 2*b* is kept closed by the opening and closing section during discharge of paint from the nozzle hole 1. This stably reduces or prevents the cleaning liquid from being mixed into the paint.

At the time when the coating operation is finished, the nozzle hole 1 and the liquid chamber 2 have paint adhering to or are filled with paint. If the nozzle hole 1 and the liquid chamber 2 are left in such a condition, the paint may be solidified, or the paint component may be precipitated, possibly causing clogging of the nozzle hole 1 or the liquid chamber 2. To prevent or reduce such clogging, the nozzle hole 1 and the liquid chamber 2 are cleaned or washed with a cleaning liquid, which is effective. However, a typical cleaning method involves injecting a cleaning liquid into the outlet of the nozzle hole 1 using a cleaning tool. The typical cleaning method may cause complicated and time-consuming cleaning operation and lower coating productivity.

To deal with such disadvantages, the coating nozzle 10 according to an embodiment includes a cleaning-liquid supplier 7 that supplies a cleaning liquid to the liquid chamber 2. The cleaning-liquid supplier 7 supplies a cleaning liquid fed by the cleaning-liquid feeding mechanism 22 to the liquid chamber 2 and thus allows the cleaning liquid in the liquid chamber 2 to be discharged from the nozzle hole 1. This enables a cleaning operation involving cleaning the nozzle hole 1 and the interior of the liquid chamber 2 with the cleaning liquid without using a cleaning tool. Moreover, since the coating operation can be continued while repeating the coating and the cleaning by appropriately executing the cleaning operation in the middle of the coating operation, it is possible to reduce the maintenance load.

During the period from the cleaning operation to the restart of the coating operation (for example, immediately before the start of the coating operation), a paint filling operation is performed, including causing a cleaning liquid remaining in the liquid chamber 2 and the nozzle hole 1 to be discharged therefrom and injecting paint into the liquid chamber 2 and the nozzle hole 1 again to make the liquid chamber 2 and the nozzle hole 1 filled with the paint. At this time, if the coating nozzle has a configuration that causes the cleaning liquid injected into the liquid chamber 2 to enter the paint supplier 3 during the cleaning operation, the cleaning liquid may be mixed into the paint in the paint supplier 3. In such a case, both the cleaning liquid in the liquid chamber 2 and the nozzle hole 1 and the paint mixed with the cleaning liquid in the paint supplier 3 are discharged from the nozzle hole 1 in the paint filling operation. This involves unnecessary consumption of the paint.

The coating nozzle 1 as illustrated in FIGS. 1 to 4 includes the needle valve 4 (or an opening and closing section) that opens and closes the paint inlet 2*a* of the liquid chamber 2. The needle valve 4 serves as a switching section that selectively enables or disables discharge of coating material from the nozzle hole 1. This configuration using the needle valve 4 closes the paint inlet 2*a* of the liquid chamber 2 to prevent the cleaning liquid supplied from the cleaning-liquid supplier 7 to the liquid chamber 2 from entering the paint supplier 3 in the cleaning operation. This further prevents mixture of the cleaning liquid and the paint in the paint supplier 3 and eliminates a process of discharging the paint mixed with the cleaning liquid in the paint supplier 3, thus facilitating the paint filling operation that involves discharging only the cleaning liquid within the liquid chamber 2 and the nozzle hole 1. Thus, the coating nozzle according to an embodiment of the present disclosure prevents or reduce unnecessary consumption of the paint.

The coating nozzle 10 as illustrated in FIGS. 1 to 4 particularly features the needle valve 4 that enables or disables the discharge of paint from the nozzle hole 1, i.e., the configuration that prevents mixture of the cleaning liquid into the paint supplier 3 in the cleaning operation. This configuration eliminates an additional element or structure for preventing the mixture of the cleaning liquid into the paint supplier 3 in the cleaning operation.

The configuration that prevents the cleaning liquid into the paint supplier 3 in the cleaning operation is not limited to the above-described configuration. As described above, in the configuration as illustrated in FIGS. 1 to 4, the paint feeding mechanism 21 and the cleaning-liquid feeding mechanism 22 feed the respective liquids, independently of each other. This configuration stops the paint feeding mechanism 21 to prevent the backflow of paint and thus prevents the cleaning liquid fed from the cleaning-liquid supplier 7 to the liquid chamber 2 from entering the paint supplier 3 in the cleaning operation.

In the liquid chamber 2 according to an embodiment of the present disclosure, the liquid chamber 2 has paint inlet 2*a* (a first inlet) at which the paint supplier 3 is connected to the liquid chamber 2 and the cleaning-liquid inlet 2*b* (a second inlet) at which the cleaning-liquid supplier 7 is connected to the liquid chamber 2. The cleaning-liquid inlet 2*b* (the second inlet) is closer to the nozzle hole 1 than the paint inlet 2*a* (the first inlet). This arrangement reduces the cleaning liquid fed from the cleaning-liquid inlet 2*b* to the liquid chamber 2 from being moved to the paint inlet 2*a* and thus prevents or reduces the cleaning liquid from being mixed into the interior of the paint supplier 3.

The paint inlet 2*a* and the cleaning-liquid inlet 2*b* are preferably close to each other. In the embodiment illustrated in FIGS. 1 to 4, the needle valve 4 is at the closed position to have its leading end protruding beyond the paint inlet 2*a* into the liquid chamber 2 in the cleaning operation. This arrangement in which the paint inlet 2*a* and the cleaning-liquid inlet 2*b* are close to each other allows the leading end of the needle valve 4 protruding beyond the paint inlet 2*a* to be washed or cleaned with the cleaning liquid flown into the liquid chamber 2 from the cleaning-liquid inlet 2*b*.

Figure 4:
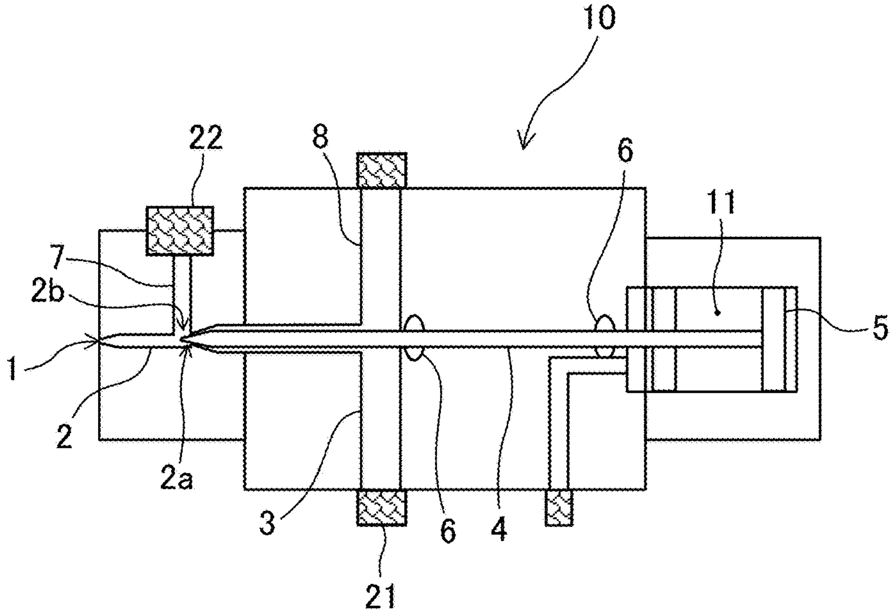
FIG. 4 is an illustration of a coating nozzle including a circulation channel for circulating paint, according to another embodiment of the present disclosure.

In the coating nozzle 10 according to an embodiment as illustrated in FIG. 4, the paint supplier 3 includes a circulation channel 8 for circulating the paint. In this case, the circulation channel 8 of the coating nozzle 10 has an outlet connected to a return channel for returning the paint to the paint supplier 3. This configuration allows circulation of the paint within the paint supplier 3. Circulating the paint while the operation of discharging the paint from the nozzle hole 1 is stopped reduces and prevents separation and precipitation of paint component from the paint. This allows the use of paint, from which paint component is likely to separate or precipitate and enables a wider range of kinds of coating materials to be used in the coating nozzle 10. The paint (coating material) is circulated using energy applied from, for example, a gear pump or an air pump, with the paint inlet 2*a* of the liquid chamber 2 closed by the needle valve 4.

The following describes a coating apparatus incorporating the coating nozzle 10 according to an embodiment of the present disclosure.

Figure 5:
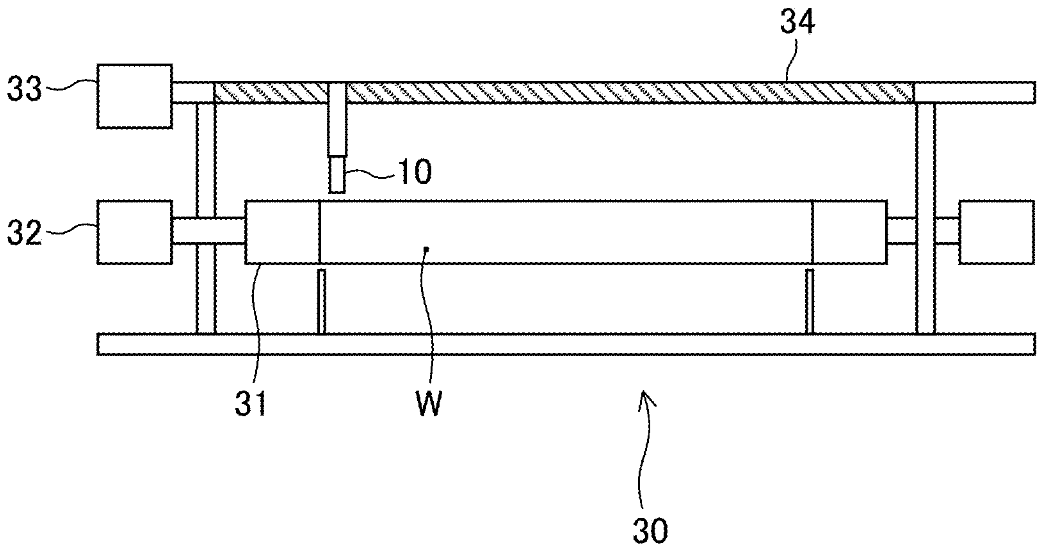
FIG. 5 is a diagram of a coating apparatus 30 incorporating a coating nozzle according to an embodiment of the present disclosure.

FIG. 5 is a diagram of a coating apparatus 30 incorporating a coating nozzle 10 according to an embodiment of the present disclosure.

The coating apparatus incorporating the coating nozzle 10 according to an embodiment of the present disclosure is not limited to the example in FIG. 5. For example, the coating apparatus may be a spray coating apparatus or other typical nozzle coating apparatuses. The coating apparatus 30 as illustrated in FIG. 5 is particularly preferable, which includes: the coating nozzle 10: a holder 31 as a rotator holding an object W to be coated (e.g., a columnar member and a belt-shaped member) on the holder 31; and a motor 32 configured to rotate the holder 31. The coating nozzle 10 discharges paint onto the object W to be coated in the coating operation. Such a coating apparatus 30 facilitates control of the uniformity of the coating film and a coating tact time.

The coating apparatus 30 in FIG. 5 further includes a slid unit 34 on the axis of which the coating nozzle 10 is disposed; and another motor 33 configured to rotate the axis of the slid unit 34 to allow the coating nozzle 10 to move along the axis of rotation of the holder 31. This allows the coating film to maintain its uniformity on the object W to be coated having a wide width for coating.

The above-described embodiments are limited examples, and the present disclosure includes, for example, the following aspects having advantageous effects.

Aspect 1

A coating nozzle includes: a nozzle hole 1 from which a liquid paint is discharged in a liquid discharge direction: a liquid chamber 2 communicating with the nozzle hole 1: a paint supply channel (a paint supplier 3) communicating with the liquid chamber, the paint supply channel configured to supply the liquid paint to the liquid chamber: a cleaning-liquid supply channel (a cleaning-liquid suppler 7) communicating with the liquid chamber, the cleaning-liquid supply channel configured to supply a cleaning liquid to the liquid chamber; and a switching section (e.g., a needle valve 4) configured to selectively switch communication and non-communication between the paint supply channel and the liquid chamber.

To prevent or reduce clogging of the nozzle hole or the liquid chamber with liquid coating material, or paint in the coating nozzle, cleaning the nozzle hole and the liquid chamber with a cleaning liquid is effective. However, a typical cleaning method involves injecting a cleaning liquid into the outlet of the nozzle hole using a cleaning tool. The typical cleaning method causes complicated and time-consuming cleaning operation and lowers coating productivity.

By contrast, embodiments of the present disclosure include a cleaning-liquid supplier for supplying a cleaning liquid to the liquid chamber and involve injecting a cleaning liquid into the liquid chamber and the nozzle hole without using a cleaning tool. Embodiments of the present disclosure enable a shorter cleaning time and reduce or prevent a decrease in coating productivity as compared to a cleaning operation using a cleaning tool.

Aspect 2

The coating nozzle according to Aspect 1, further includes: a body including: the paint supply channel: the cleaning-liquid supply channel; and the switching section; and a nozzle part 12 including, the liquid chamber; and the nozzle hole. The nozzle part is attachable to or detachable from the body.

This facilitates the maintenance of the nozzle hole (e.g., cleaning) or a change in the shape or dimension of the nozzle hole according to the coating application.

Aspect 3

The coating nozzle according to Aspect 1 or 2, the liquid chamber has: a first inlet (a paint inlet 21) at which the paint supply channel is connected to the liquid chamber; and a second inlet (a cleaning-liquid inlet 2*b*) at which the cleaning-liquid supply channel is connected to the liquid chamber. The second inlet is closer to the nozzle hole than the first inlet in the liquid discharge direction.

This arrangement reduces the cleaning liquid fed from the cleaning-liquid inlet 2*b* to the liquid chamber 2 from being moved to the paint inlet 2*a* and thus prevents or reduces the cleaning liquid from being mixed into the interior of the paint supplier 3.

Aspect 4

The coating nozzle according to any one of Aspect 1 to Aspect 3, the switching section (e.g., the needle valve 4) openably closes the first inlet.

During the period from the cleaning operation to the restart of the coating operation, a paint filling operation is performed, including causing a cleaning liquid remaining in the liquid chamber and the nozzle hole to be discharged therefrom and injecting paint into the liquid chamber and the nozzle hole again to fill the paint into the liquid chamber and the nozzle hole. At this time, if the coating nozzle has a configuration that causes the cleaning liquid injected into the liquid chamber to enter the paint supplier during the cleaning operation, the cleaning liquid may be mixed into the paint in the paint supplier. In such a case, both the cleaning liquid in the liquid chamber and the nozzle hole and the paint mixed with the cleaning liquid in the paint supplier are discharged from the nozzle hole in the paint filling operation. This involves unnecessary consumption of the paint.

In this configuration, the coating nozzle includes an opening and closing section that opens and closes the paint inlet of the liquid chamber to which the liquid paint is supplied from the paint supplier. The opening and closing section serves as a switching section that enables or disables discharge of the liquid paint from the nozzle hole.

This configuration using the opening and closing section closes the paint inlet of the liquid chamber to prevent the cleaning liquid supplied from the cleaning-liquid supplier to the liquid chamber from entering the paint supplier in the cleaning operation.

Further, the opening and closing section that enables or disables the discharge of the liquid paint from the nozzle hole allows the paint inlet of the liquid chamber to be closed. This eliminates the use of an additional configuration that prevents the cleaning liquid fed to the liquid chamber from entering the paint supplier.

Aspect 5

The coating nozzle according to Aspect 4, the switching section includes a needle valve 4 that openably closes the first inlet.

This configuration enables a simple opening and closing section that opens and closes the paint inlet 2*a* of the liquid chamber.

Aspect 6

The coating nozzle according to Aspect 5, further includes: a driver 5 in an accommodating space 11, the driver configured to drive the needle valve; and a blocker (e.g., an elastic diaphragm 6) attached to the needle valve. The blocker blocks the liquid paint in the paint supply channel (the paint supplier 3) from entering the accommodating space.

In this configuration, the blocker prevents the paint in the paint supplier 3 from entering the accommodating space 11, thus preventing or reducing an unstable operation of the driver 5 due to contact of the driver 5 with the paint.

Aspect 7

The coating nozzle according to Aspect 7, the driver electromagnetically, pneumatically, or piezoelectrically drives the needle valve.

This enables an appropriate driving of the needle valve.

Aspect 8

The coating nozzle according to Aspect 6 or 7, the blocker is resistant to a solvent contained in the liquid paint or the cleaning liquid.

This configuration extends the life of the blocker and achieves a stable driving over a long period of time.

Aspect 9

The coating nozzle according to any one of Aspect 1 to Aspect 8, the nozzle hole has: a minimum opening dimension of 20 μm or more; and a maximum opening dimension of 500 μm or less.

This configuration prevents or reduces clogging of the nozzle hole with foreign substance as well as a deterioration in the non-uniformity of the coating film due to an excessively large opening of the nozzle hole.

Aspect 10

The coating nozzle according to any one of Aspect 1 to Aspect 9, the paint supply channel includes a circulation channel, from which the liquid paint is discharged, to circulate the liquid paint.

This configuration prevents or reduces paint component from separating or precipitating from the paint by circulating the paint. This allows the use of paint, from which paint component is likely to separate or precipitate, and enables a wider range of kinds of coating materials to be used in the coating nozzle.

Aspect 11

A coating apparatus includes: the coating nozzle according to Aspect 1; and a slider including an axis to which the coating nozzle is attached, the slider configured to move the coating nozzle in an axial direction of the axis.

This configuration provides a coating apparatus that enables a shorter cleaning time and reduces or prevents a decrease in coating productivity.

Aspect 12

In Aspect 11, the coating apparatus further includes a rotator (e.g., a holder 31) configured to rotate an object W. The coating nozzle is configured to discharge the liquid paint to the object rotated by the rotator to coat the object with the liquid paint.

This configuration provides a coating apparatus that facilitates control of the uniformity of the coating film and a coating tact time.

Aspect 13

The coating nozzle according to Aspect 1, the first inlet is in a vicinity of the second inlet. The needle valve has a leading end to close the first inlet at a closed position. The leading end of the needle valve at the closed position protrudes into an interior of the liquid chamber from the first inlet.

Aspect 14

The coating nozzle according to Aspect 11, the cleaning liquid supplied from the cleaning-liquid supply channel is supplied from the second inlet to the liquid chamber in a state where the needle valve closes the first inlet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A coating nozzle comprising:

a nozzle hole from which a liquid paint is discharged in a liquid discharge direction;

a liquid chamber communicating with the nozzle hole;

a paint supply channel communicating with the liquid chamber, the paint supply channel configured to supply the liquid paint to the liquid chamber;

a cleaning-liquid supply channel communicating with the liquid chamber, the cleaning-liquid supply channel configured to supply a cleaning liquid to the liquid chamber; and a needle valve configured to selectively switch communication and non-communication between the paint supply channel and the liquid chamber, wherein the cleaning-liquid supply channel is configured to supply the cleaning liquid in a region between a closed tip of the needle valve and the nozzle hole, independently from the paint supply channel supplying the liquid paint to the liquid chamber, and while supplying of the liquid paint by the paint supply channel is stopped, and the paint supply channel is configured to supply the liquid paint to the liquid chamber while supplying of the cleaning liquid by the cleaning-liquid supply channel is stopped.

2. The coating nozzle according to claim 1, further comprising:

a body including:

the paint supply channel;

the cleaning-liquid supply channel; and the needle valve; and a nozzle part including:

the liquid chamber; and the nozzle hole, wherein the nozzle part is attachable to or detachable from the body.

3. The coating nozzle according to claim 1, wherein the liquid chamber has:

a first inlet at which the paint supply channel is connected to the liquid chamber; and a second inlet at which the cleaning-liquid supply channel is connected to the liquid chamber, and the second inlet is closer to the nozzle hole than the first inlet in the liquid discharge direction.

4. The coating nozzle according to claim 3, wherein the needle valve openably closes the first inlet.

5. The coating nozzle according to claim 4, further comprising:

a driver in an accommodating space, the driver configured to drive the needle valve; and a blocker attached to the needle valve, the blocker configured to block the liquid paint in the paint supply channel from entering the accommodating space.

6. The coating nozzle according to claim 5, wherein the driver electromagnetically, pneumatically, or piezoelectrically drives the needle valve.

7. The coating nozzle according to claim 5, wherein the blocker is resistant to a solvent contained in the liquid paint or the cleaning liquid.

8. The coating nozzle according to claim 1, wherein the nozzle hole has:

a minimum opening dimension of 20 μm or more; and a maximum opening dimension of 500 μm or less.

9. The coating nozzle according to claim 1, wherein the paint supply channel includes a circulation channel, from which the liquid paint is discharged, to circulate the liquid paint.

10. The coating nozzle according to claim 1, wherein the first inlet is in a vicinity of the second inlet, the needle valve having a leading end to close the first inlet at a closed position, and the leading end of the needle valve at the closed position protrudes into an interior of the liquid chamber from the first inlet.

11. The coating nozzle according to claim 10, wherein the cleaning liquid supplied from the cleaning-liquid supply channel is supplied from the second inlet to the liquid chamber in a state where the needle valve closes the first inlet.

12. A coating apparatus comprising:

the coating nozzle according to claim 1; and a slider including an axis to which the coating nozzle is attached, the slider configured to move the coating nozzle in an axial direction of the axis.

13. The coating apparatus according to claim 12, further comprising:

a rotator configured to rotate an object, wherein the coating nozzle is configured to discharge the liquid paint to the object rotated by the rotator to coat the object with the liquid paint.

* * * * *